(12) United States Patent
Nomura et al.

(10) Patent No.: US 8,051,490 B2
(45) Date of Patent: Nov. 1, 2011

(54) COMPUTER SYSTEM FOR JUDGING WHETHER TO PERMIT USE OF DATA BASED ON LOCATION OF TERMINAL

(75) Inventors: Ken Nomura, Yokohama (JP); Hiroshi Mine, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 826 days.

(21) Appl. No.: 12/100,563

(22) Filed: Apr. 10, 2008

(65) Prior Publication Data

US 2009/0210700 A1 Aug. 20, 2009

(30) Foreign Application Priority Data

Feb. 20, 2008 (JP) ................................. 2008-038140

(51) Int. Cl.
 G06F 7/04 (2006.01)
 G06F 17/30 (2006.01)
 H04N 7/16 (2011.01)
 G06F 21/00 (2006.01)

(52) U.S. Cl. ................. 726/29; 705/57; 705/59; 726/30

(58) Field of Classification Search .............. 726/27–30; 705/57, 59
 See application file for complete search history.

(56) References Cited

U.S. PATENT DOCUMENTS

| | | | |
|---|---|---|---|
| 7,080,402 B2 | 7/2006 | Bates et al. | |
| 7,490,763 B2 * | 2/2009 | Keohane et al. | 235/382 |
| 7,523,316 B2 * | 4/2009 | Cheng et al. | 713/182 |
| 7,591,020 B2 * | 9/2009 | Kammer et al. | 726/26 |
| 7,694,148 B2 * | 4/2010 | Cheng et al. | 713/183 |
| 7,712,660 B2 * | 5/2010 | Keohane et al. | 235/382 |
| 7,849,511 B2 * | 12/2010 | Richardson et al. | 726/26 |
| 2004/0006541 A1 * | 1/2004 | Huddelston et al. | 705/51 |
| 2004/0093494 A1 * | 5/2004 | Nishimoto et al. | 713/165 |
| 2005/0204038 A1 * | 9/2005 | Medvinsky et al. | 709/225 |
| 2006/0059096 A1 * | 3/2006 | Dublish et al. | 705/57 |
| 2006/0059099 A1 * | 3/2006 | Ronning et al. | 705/59 |
| 2006/0059100 A1 * | 3/2006 | Ronning et al. | 705/59 |
| 2006/0277598 A1 * | 12/2006 | Ahn | 726/5 |
| 2007/0038680 A1 * | 2/2007 | Casey | 707/201 |
| 2007/0168294 A1 * | 7/2007 | Tsurukawa | 705/59 |
| 2007/0300058 A1 * | 12/2007 | Takala et al. | 713/155 |
| 2008/0207165 A1 * | 8/2008 | Eckhart | 455/410 |
| 2009/0217344 A1 * | 8/2009 | Bellwood et al. | 726/1 |
| 2010/0071070 A1 * | 3/2010 | Jawa et al. | 726/26 |

FOREIGN PATENT DOCUMENTS

JP 2004-032073 1/2004

* cited by examiner

*Primary Examiner* — Christian Laforgia
(74) *Attorney, Agent, or Firm* — Brundidge & Stanger, P.C.

(57) ABSTRACT

There is provided a computer system comprising a storage system, a terminal, a management server and the terminal, and a positioning module for identifying a location of the terminal. The terminal identifies the location of the terminal by the positioning module in a case of using the data, transmits terminal information including the identified location of the terminal to the management server; and transmits a usage request for the data to the management server. The management server judges whether or not use of the data is to be permitted based on the terminal information, and transmits permit information including usage conditions for the data to the terminal in a case where the use of the data is to be permitted. The terminal selects at least one of the volatile storage area and the nonvolatile storage area based on the usage conditions, and stores the copy of the data therein.

4 Claims, 13 Drawing Sheets

| PERMIT CRITERIA TABLE 620 | | | | | | |
|---|---|---|---|---|---|---|
| PERMIT CRITERIA ~606 | | | | | RESPONSE ~623 | |
| TERMINAL STATUS ~625 | | PERMIT CRITERIA ~621 | | | | |
| CURRENT AREA | DATA IMPORTANCE | UNSYNCHRONIZED DATA AMOUNT ~607 | PERMITTABLE PERIOD ~627 | PERMITTABLE AREA ~628 | PERMITTABLE DATA MANAGEMENT METHOD ~629 | AVAILABILITY OF FORCED DATA DELETION |
| INSIDE OFFICE | MOST IMPORTANT | ANY | 10 SECONDS | INSIDE OFFICE | ANY | N/A ~630 |
| OUTSIDE OFFICE | MOST IMPORTANT | ANY | ALL DENIED | ALL DENIED | ALL DENIED | FORCED DATA DELETION ~631 |
| INSIDE OFFICE | IMPORTANT | ANY | WITHIN 6 HOURS | INSIDE OFFICE/ OUTSIDE OFFICE | CACHED ONLY | N/A ~632 |
| INSIDE OFFICE | ORDINARY | 1 MByte OR MORE | WITHIN 12 HOURS | INSIDE OFFICE/ OUTSIDE OFFICE | ANY | N/A ~633 |
| INSIDE OFFICE | ORDINARY | LESS THAN 1 MByte | ANY | INSIDE OFFICE/ OUTSIDE OFFICE | ANY | N/A ~634 |
| OUTSIDE OFFICE | ORDINARY | 0 | 2 HOURS | INSIDE OFFICE/ OUTSIDE OFFICE | KEY CACHED ONLY | N/A ~635 |
| OUTSIDE OFFICE | ORDINARY | OTHER THAN 0 | ALL DENIED | ALL DENIED | ALL DENIED | N/A ~636 |
| . . . | | | | | | |

LICENSE ISSUANCE HISTORY TABLE 650

| EXAMINATION DATE/TIME | TERMINAL ID ~601 | CURRENT AREA ~606 | DATA IMPORTANCE ~625 | UNSYNCHRONIZED DATA AMOUNT ~607 | LICENSE CONTENTS ~652 | | |
|---|---|---|---|---|---|---|---|
| ~653 | | | ~651 | | PERMITTABLE PERIOD ~627 | PERMITTABLE AREA ~628 | PERMITTABLE DATA MANAGEMENT METHOD ~629 |
| 2007/1/1:13:21:10 | x00000001 | OUTSIDE OFFICE | IMPORTANT | 0 | 2 HOURS | INSIDE OFFICE/ OUTSIDE OFFICE | CACHED ONLY ~660 |
| 2007/1/1:13:35:12 | x00000021 | INSIDE OFFICE | ORDINARY | 12Mbyte | 24 HOURS | INSIDE FFICE | ALL STORED IN DISK ~661 |
| 2007/1/1:15:11:03 | x00003401 | OUTSIDE OFFICE | ORDINARY | 0 | 2 HOURS | INSIDE OFFICE/ OUTSIDE OFFICE | ONLY DATA STORED IN DISK ~662 |
| . . . . | | | | | | | |

TERMINAL MANAGEMENT TABLE 670

| TERMINAL ID ~601 | PASSWORD ~602 | STORAGE SYSTEM ADDRESS ~616 | STORAGE DEVICE NUMBER ~617 | ENCRYPTION/ DECRYPTION KEY ~132 | STORAGE DEVICE CAPACITY ~672 | STORAGE DEVICE STATE ~673 |
|---|---|---|---|---|---|---|
| x00000001 | ????? | 192.168.1.1 | 0 | 0x0x0x0x0x | 10GByte | UNUSED |
| x00000002 | ????? | 192.168.1.2 | 1 | 0x0x0x0x0x | 10GByte | IN USE |
| x00000002 | ????? | 192.168.1.2 | 5 | y2y2y2y2 | 20GByte | NEW STORAGE DEVICE IN PREPARATION |

COMPUTER SYSTEM FOR JUDGING WHETHER TO PERMIT USE OF DATA BASED ON LOCATION OF TERMINAL

CLAIM OF PRIORITY

The present application claims priority from Japanese patent applications JP 2008-38140 filed on Feb. 20, 2008, the content of which are hereby incorporated by reference into this application.

BACKGROUND

This invention relates to a technique for preventing information leakage.

Information leakage has more profound impacts on companies by an increase in capacity of media for saving data, the Private Information Protection Law that has taken effect recently, and the like. In particular, the information leakage due to theft or loss of a portable device such as an external storage device or a mobile terminal such as a mobile PC causes a serious problem in that a large amount of data leaks out at a time, which leads to a proposal of a technique for protecting against theft and loss.

For example, JP 2004-32073 A discloses a technique of remotely deleting information within a terminal by use of a management server.

SUMMARY

In the technique disclosed in JP 2004-32073 A, a data deletion application within the remote terminal receives a deletion command sent from the management server and executes data deletion to thereby prevent the information leakage.

However, with the conventional technique disclosed in JP 2004-32073 A, it is impossible to change an information leakage prevention method such as a data deletion method according to an importance of data within the terminal or a location of the terminal. This raises a problem in that it is impossible to properly use information leakage prevention methods with flexibility, for example, to prioritize convenience for data having a low importance while prioritizing safety for data having a high importance.

This invention provides an information leakage prevention technique which allows a change of an information leakage prevention method such as a data deletion method according to an importance of data.

A representative aspect of this invention is as follows. That is, there is provided a computer system comprising: a storage system for storing data; a terminal for using the data; a management server coupled to the storage system and the terminal; and a positioning module for identifying a location of the terminal. The storage system comprises a first interface coupled to the management server, a first processor coupled to the first interface, a first memory coupled to the first processor, and a first storage device for storing the data. The terminal comprises a second interface coupled to the management server, a second processor coupled to the second interface, and a second storage device for storing a copy of the data which includes a volatile storage area and a nonvolatile storage area. The management server comprising a third interface coupled to the storage system and the terminal, a third processor coupled to the third interface, and a third memory coupled to the third processor. The terminal identifies the location of the terminal by the positioning module in a case of using the data, transmits terminal information including the identified location of the terminal to the management server; and transmits a usage request for the data to the management server. The management server judges whether or not use of the data is to be permitted based on the terminal information, and transmits permit information including usage conditions for the data to the terminal in a case where the use of the data is to be permitted. The terminal selects at least one of the volatile storage area and the nonvolatile storage area based on the usage conditions, and stores the copy of the data in the selected storage area.

According to an embodiment of this invention, it is possible to take proper countermeasures against information leakage according to the location of the terminal or the importance of data.

BRIEF DESCRIPTION OF THE DRAWINGS

The present invention can be appreciated by the description which follows in conjunction with the following figures, wherein:

FIG. 5 is an explanatory diagram showing an example of a permit criteria table for defining criteria used by the management server to permit or reject the usage application in accordance with the first embodiment of this invention;

FIG. 6 is an explanatory diagram showing an example of a license issuance history table in accordance with the first embodiment of this invention;

FIG. 7 is an explanatory diagram showing an example of a terminal management table in accordance with the first embodiment of this invention;

DETAILED DESCRIPTION OF THE PREFERRED EMBODIMENT

Figure 1:
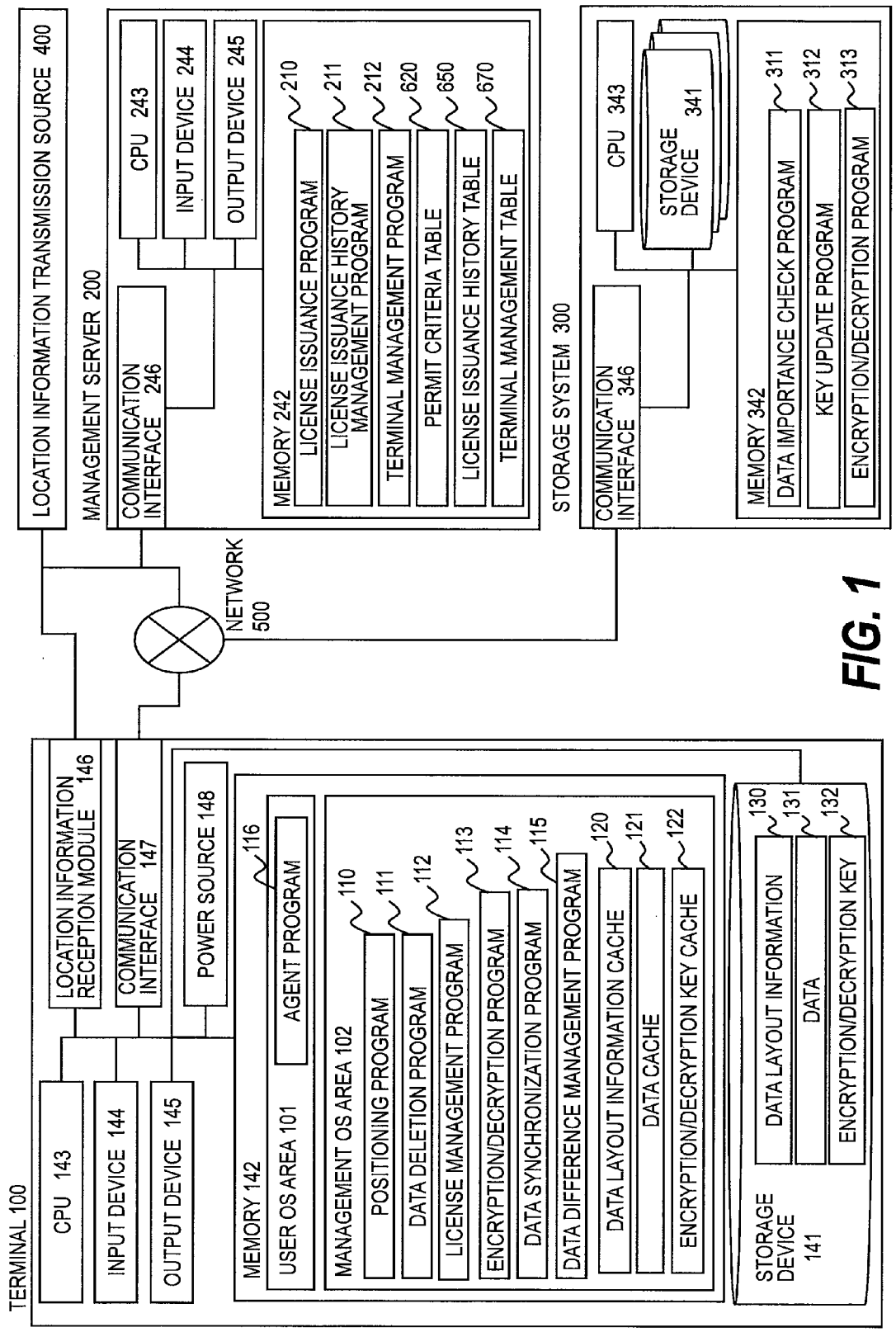
FIG. 1 is a block diagram showing a system configuration example of a computer system in accordance with a first embodiment of this invention.

FIG. 1 is a block diagram showing a system configuration example of a computer system 1 according to an embodiment of this invention.

The computer system 1 according to the embodiment of this invention includes a terminal 100, a management server 200, a storage system 300, and a location information transmission source 400. The terminal 100, the management server 200, the storage system 300, and the location information transmission source 400 are coupled to one another via a network 500. The location information transmission source 400 and the terminal 100 may not necessarily be coupled to each other via the network 500. For example, the location information transmission source 400 may be a GPS satellite, and the terminal 100 may receive a radio wave from the GPS satellite to identify the location.

The management server 200 and the storage system 300 are set in a server room (not shown in FIG. 1) that is physically isolated. Between the management server 200 and storage system 300 and the terminal 100, there may exists a relay server or a firewall at which an access authentication is performed.

The terminal 100 includes a storage device 141, a memory 142, a CPU 143, an input device 144, an output device 145, a location information reception module 146, a communication interface 147, and a power source 148.

The CPU 143 executes a predetermined processing according to a procedure described in a program stored in the memory 142. For example, the CPU 143 inputs/outputs data to/from the storage device 141, the memory 142, the input device 144, the output device 145, the location information reception module 146, and/or the communication interface 147.

The memory 142 stores the program executed by the CPU 143 or data necessary for executing the predetermined processing. The memory 142 represents a volatile memory. This means that all of contents stored in the memory 142 are lost when the power source 148 of the terminal 100 is shut off. Therefore, in an initial state immediately after the terminal is booted up, the program to be stored in the memory 142 is stored in a nonvolatile storage area of the storage device 141 or the like other than the memory 142, and loaded in the memory 142 upon execution.

The input device 144 receives an input from a user. The output device 145 displays, for example, processing results from the CPU 143. The location information reception module 146 receives information from the location information transmission source 400. The terminal 100 identifies a location of the terminal 100 based on the information received by the location information reception module 146. The communication interface 147 is coupled to the network 500. The power source 148 supplies power to the components of the terminal 100 such as the CPU 143 and the memory 142. The power source 148 is controlled based on the standards such as ACPI.

The memory 142 includes two areas, in other words, a user OS area 101 and a management OS area 102. The user OS area 101 represents a storage area operable by the user of the terminal 100. The management OS area 102 represents a storage area having resistance to tampering to prevent the user of the terminal 100 from referencing the content. If any notification needs to be sent from the user OS area 101 to the management OS area 102, an agent program 116 executed on the user OS area 101 handles the processing between the user OS area 101 and the management OS area 102.

Stored in the management OS area 102 are a positioning program 110, a data deletion program 111, a license management program 112, an encryption/decryption program 113, a data synchronization program 114, a data difference management program 115, and cache information. The cache information contains a data layout information cache 120, a data cache 121, and an encryption/decryption key cache 122.

The cache information represents such information that data layout information 130, data 131, and an encryption/decryption key 132 stored on the storage device 141 are temporarily read into the memory 142. If the cache information is stored in the memory 142, instead of access to the data stored on the storage device 141, the cache information is subjected to data read/write.

As described above, the storage device 141 represents a nonvolatile storage device, for example, a magnetic storage device such as a hard disk drive. The storage device 141 stores the data layout information 130, the data 131, and the encryption/decryption key 132. The storage device 141 may store a program (not shown) such as an OS program executed in the user OS area 101, a management OS program executed in the management OS area 102, or the above-mentioned data deletion program 111. In particular, information that needs protection against information leakage is stored as the data 131.

In the embodiment of this invention, the processing executed by the program in the user OS area 101 is configured so as not to be able to directly input/output information to/from the storage device 141. Therefore, any of the programs stored in the management OS area 102 needs to mediate an input/output of information to/from the storage device 141. In the case of outputting information to the storage device 141 by the program executed in the user OS area 101, the encryption/decryption program 113 is executed to encrypt the information based on the encryption/decryption key 132 and record the information as the data 131. On the other hand, in the case of reading information from the storage device 141, a corresponding portion of the data 131 is read, and the encryption/decryption key 132 is used to decrypt the information. However, if the cache information exists, the information is not inputted to/outputted from the storage device 141, but is read from the cache information.

The positioning program 110 acquires location information of the terminal that can be received via the location information reception module 146 or the communication interface 147.

If permit conditions defined by a license 610 acquired by the license management program 112 are not satisfied, the data deletion program 111 deletes the data layout information 130, the data 131, the encryption/decryption key 132, and their cache information based on a data management method 615 defined by the license 610. Accordingly, even when the terminal 100 is in such an offline state as being decoupled from the management server 200, the data can be deleted if the state of the terminal no longer satisfies the conditions described in the license 610. The license 610 will be described later with reference to FIG. 4.

The license management program 112 acquires the license 610 from the management server 200. A procedure for acquiring the license 610 will be described later with reference to FIG. 9.

The encryption/decryption program 113 encrypts the data 131 (or the data cache 121), and stores the data 131 (or the data cache 121) on the storage device 141 (or the memory 142). If the data 131 (or the data cache 121) is read, the encryption/decryption program 113 decrypts the read data.

The data synchronization program 114 transfers the data 131 (or the data cache 121) and the data layout information 130 (or the data layout information cache 120) that are stored on the storage device 141 to the storage system 300 for synchronization (for matching contents of those data). In contrast, if the data 131 has been deleted, the data synchronization program 114 transfers the data 131 from the storage system 300 to the storage device 141 for synchronization. As long as the terminal 100 is coupled to the network 500, the synchronization of the data is executed periodically regardless of a processing executed on the terminal 100. A synchronization procedure will be described later with reference to FIG. 11.

In the case of transmitting the data 131 to the storage system 300 for synchronization between the data 131 and the data stored on the storage system 300, the terminal 100 does not always need to decrypt the data 131 before transmission thereof. Because the storage system 300 also includes an encryption/decryption program 313, by previously transmitting an encryption/decryption key from the management server 200 to the storage system 300, the storage system 300 can decrypt and reference the data 131 at any time. Therefore, a synchronization processing can be executed in a state in which the encryption/decryption key 132 on the terminal 100 has been discarded. In other words, if there is a sign of theft, the encryption/decryption key 132 can be discarded immediately to thereby bring the data 131 into such a safe state as to prevent information leakage, and even if the data 131 has a portion in which data is not synchronized, the data transfer to the storage system 300 can be continued in order to prevent information loss. It should be noted that examples of the sign of theft may include a case where an erroneous password is inputted a plurality of times.

The data difference management program 115 manages an area in which the synchronization is not complete (unsynchronized data). In particular, if the terminal 100 is not coupled to the network 500, the terminal 100 cannot be synchronized with the storage system 300, so each time the data 131 is updated by the program in the user OS area 101, the terminal 100 checks the update portion, and notifies the data synchronization program 114 of the area that needs data transfer when the terminal 100 is coupled to the network 500 again.

The management server 200 includes a memory 242, a CPU 243, an input device 244, an output device 245, a communication interface 246, and a storage device (not shown). According to a procedure described in a program stored in the memory 242, the CPU 243 inputs/outputs data to/from the memory 242, the input device 244, the output device 245, or the communication interface 246.

The memory 242 stores a license issuance program 210, a license issuance history management program 211, and a terminal management program 212. The license issuance program 210, the license issuance history management program 211, and the terminal management program 212 are also stored on the storage device (not shown), and loaded in the memory 242 as necessary.

Based on a usage application 600 transmitted from the terminal 100, the license issuance program 210 judges whether the usage application 600 is permitted or rejected, and transmits the license 610. It is judged based on a permit criteria table 620 whether the usage application 600 is permitted or rejected. The permit criteria table 620 will be described later with reference to FIG. 5. The license 610 will be described later with reference to FIG. 4. A procedure for issuing the license 610 will be described later with reference to FIG. 10.

The license issuance history management program 211 manages an issuance history of the license 610. The issuance history of the license 610 is recorded in a license issuance history table 650. The license issuance history table 650 will be described later with reference to FIG. 6.

The terminal management program 212 manages a correspondence relationship between the storage device 141 of the terminal 100 and a synchronization partner, in other words, a storage device 341 of the storage system 300. The correspondence relationship between the storage device 141 of the terminal 100 and the storage device 341 of the storage system 300 is recorded in a terminal management table 670. The terminal management table 670 will be described later with reference to FIG. 7.

The storage system 300 includes a memory 342, a CPU 343, a communication interface 346, and a plurality of storage devices 341. According to a procedure described in a program stored in the memory 342, the CPU 343 inputs/outputs data to/from the storage device 341, the memory 342, or the communication interface 346.

The memory 342 stores a data importance check program 311, a key update program 312, and the encryption/decryption program 313.

The data importance check program 311 judges an importance of data stored on the storage device 341. To be specific, the data is judged to be important in a case where a corresponding pattern is detected as a result of searching preset patterns specific to important documents. Examples of the patterns specific to important documents include a document containing a specific description (for example, "Important" and "For Internal Use Only") and a document described according to a specific format (for example, format for a confidential document).

The key update program 312 periodically exchanges an encryption/decryption key with a new key. A procedure for updating a key will be described later with reference to FIG. 13.

The encryption/decryption program 313 encrypts and decrypts data in a similar manner as the encryption/decryption program 113 of the terminal 100.

It should be noted that a general storage system in which none of the data importance check program 311, the key update program 312, and the encryption/decryption program 313 are not installed may be set along with a server device including those programs, and those programs may be executed by the server device.

The location information transmission source 400 may be in a wide variety of forms as long as having a function of transmitting information for identifying the location of the terminal 100. For example, the location information transmission source 400 may be a source of radio wave transmission such as a GPS satellite, or a server device that is set in a corporate intranet and issues an in-office certificate. The obtained location information may be information for merely distinguishing between in-office and out-of-office location, or may be accurate current position information such as latitude/longitude coordinates on Earth.

As described above, if the state of the terminal does not satisfy the permit conditions defined in the license 610, it is possible even in an offline state to delete data by execution of the data deletion program 111, thereby preventing information leakage. To be specific, if the current time has passed the expiration of data which is contained in the license 610, the data deletion program 111 may be executed to forcedly delete the data, thereby preventing information leakage. Further, if important data whose use is allowed only inside an office is carried out of the office, the data deletion program 111 may be executed to forcedly delete the data, thereby preventing information leakage.

However, in a case where the power source is shut off before the execution of data deletion, in particular, in a case where the terminal 100 is disassembled and the storage device is directly extracted, the data deletion program 111 cannot be executed, which leads to a fear of failure in prevention of the information leakage.

Even if the terminal 100 is physically disassembled, the terminal 100 according to the embodiment of this invention can prevent the information leakage. Hereinafter, FIG. 2 will be referenced to describe means for preventing information leakage.

Figure 2:
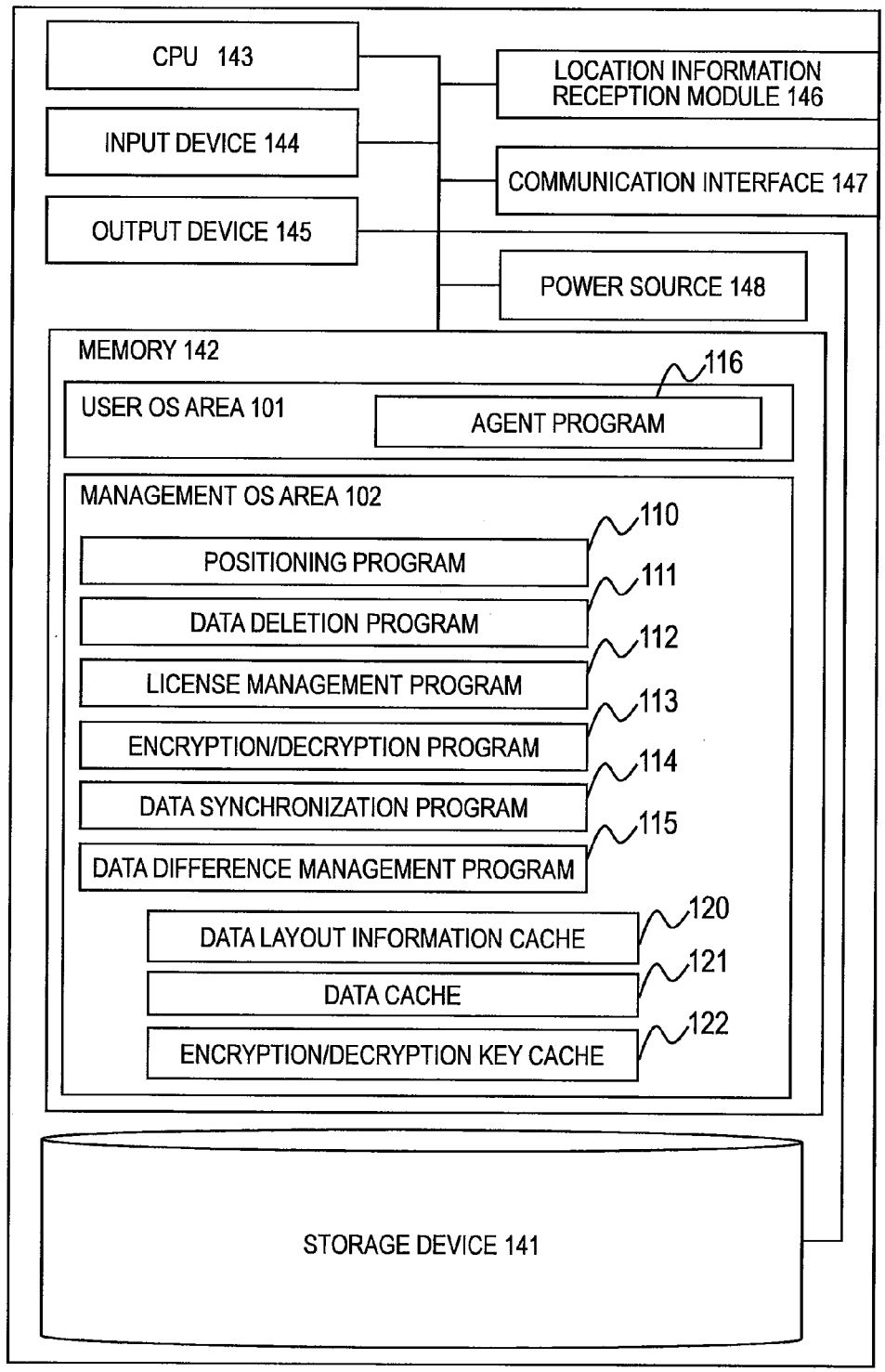
FIG. 2 is a block diagram showing a configuration of a terminal in accordance with the first embodiment of this invention.

FIG. 2 is a diagram showing a configuration of the terminal 100 according to the embodiment of this invention.

The terminal 100 shown in FIG. 2 is different from the terminal 100 shown in FIG. 1 in that the storage device 141 does not include the data layout information 130, the data 131, or the encryption/decryption key 132.

After storing data on the storage device 141 and the memory 142 based on the data management method 615 specified in the license 610 issued by the management server 200, the terminal 100 executes the data deletion program 111 to delete data and the like stored on the storage device 141. However, if the data 131 is so large in size that all of the data 131 cannot be cached in the memory, a portion that cannot be cached is left on the storage device 141.

Even in a state in which the information stored on the storage device 141 has been deleted, the terminal 100 can be used by maintaining a state in which power is supplied to the memory 142 such as a suspend state without shutting off the power source of the terminal 100. The suspend state represents a state in which a work state is saved in the memory 142 and a device and a program are temporarily stopped during execution thereof. After recovery from the suspend state, the processing is immediately restarted.

On the other hand, if the terminal 100 is disassembled in the state shown in FIG. 2, the power source supplied to the memory 142 is discontinued, and all of the information in the memory 142 is lost, so the storage device 141 from which the data is previously deleted remains. If all of the data 131 is not cached in the memory, fragments of the decrypted data 131 are left, but the data layout information 130, which indicates which part on the storage device 141 those fragments correspond to, has been lost, so the data 131 cannot recover the original state.

If only the encryption/decryption key 132 is deleted from the storage device 141, the terminal 100 can be used while the encryption/decryption key cache 122 is stored in the memory 142. However, if the disassembly of the terminal 100 is attempted, the key is lost when the power source supplied to the memory 142 is stopped, and the key on the storage device 141 has been deleted, so it becomes impossible to read the data, which enhances safety against information leakage. Further, if the terminal 100 is found, the data can be recovered merely by acquiring a key again.

On the other hand, if the data 131 has been deleted from the storage device 141, the safety against information leakage is higher, but all of the data must be acquired again from the storage system 300, which is not an easy recovery. Thus, as the safety against information leakage is further enhanced, the convenience is liable to become lower, which can be coped with by effecting proper information leakage countermeasures based on the importance of data stored on the terminal 100, the location of the terminal 100, and the like.

It should be noted that a cache of a general storage device is an existing technology for realizing high speed access by previously reading data in a memory that allows higher access speed than the storage device. In general, because contents of the cache are lost if the power source of the device should be shut off, contents written most recently are left on the storage device so that even if the latest information in the memory is lost, information of a little older version is left. On the other hand, in this invention, information is not left on the storage device so as to lose data on purpose, which is different from the cache of the general storage device.

Figure 3:
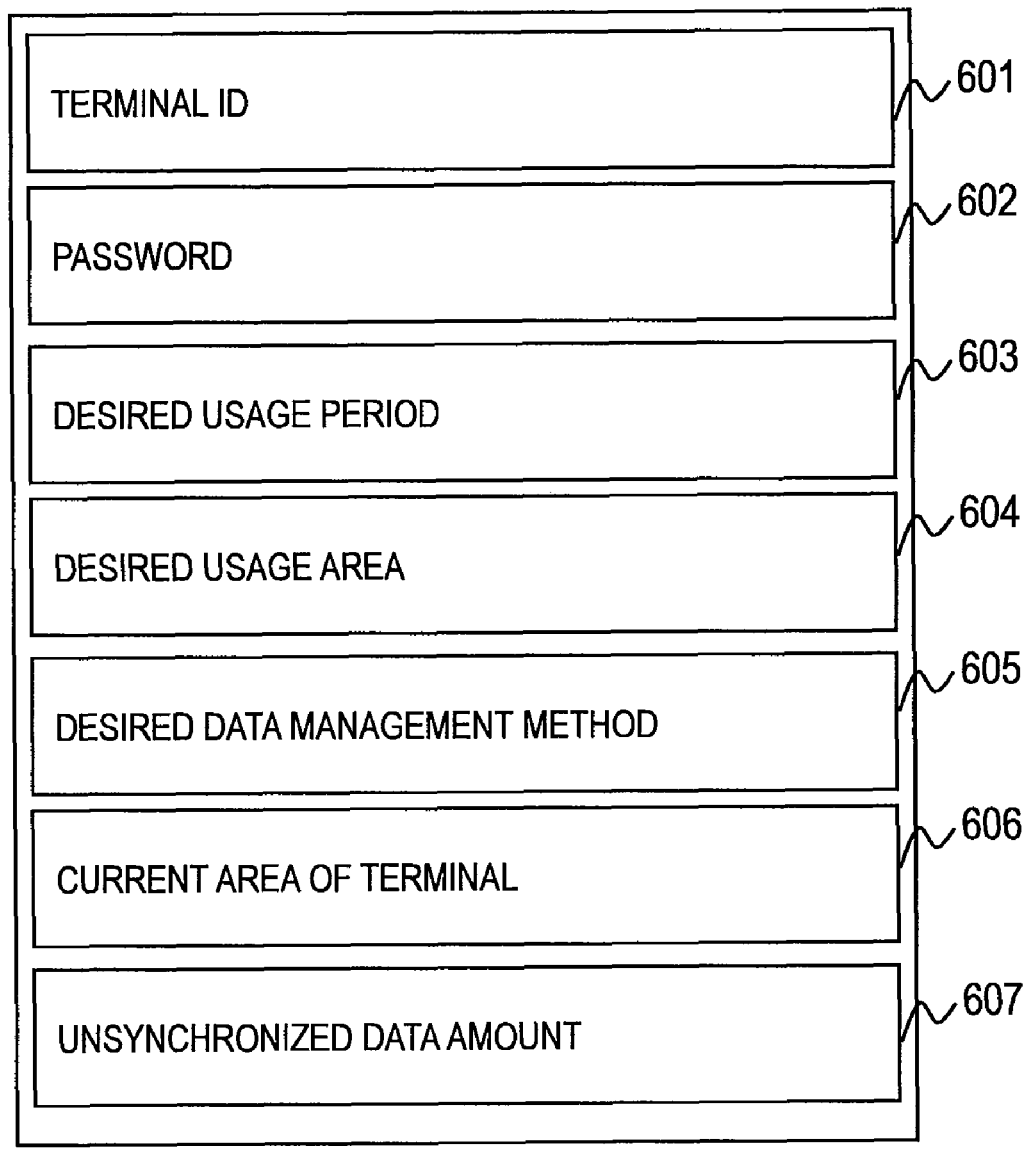
FIG. 3 is an explanatory diagram showing an example of a usage application transmitted from the terminal to a management server in accordance with the first embodiment of this invention.

FIG. 3 is an explanatory diagram showing an example of the usage application 600 transmitted from the terminal 100 to the management server 200 according to the embodiment of this invention.

The usage application 600 contains a terminal ID 601, a password 602, a desired usage period 603, a desired usage area 604, a desired data management method 605, a current area 606, and an unsynchronized data amount 607.

The terminal ID 601 and the password 602 represent information for identifying the terminal 100. Stored as the desired usage period 603, the desired usage area 604, and the desired data management method 605 are usage conditions of the terminal 100. The current area 606 and the unsynchronized data amount 607 indicate a current state of the terminal.

The desired usage period 603 represents a period during which data acquired from the storage system 300 is to be used. The desired usage area 604 represents a location where the acquired data is to be used. For example, to use data outside an office after acquiring the data inside the office, the desired usage area 604 is set to "outside office". The desired data management method 605 represents a mode of holding data on the terminal 100. For example, the data may be held in the storage device 141, or may be held only in the memory 142. The items for desires such as the desired usage period 603 can be omitted to apply for the longest period that can be permitted.

The current area 606 represents a location where the terminal 100 exists. The unsynchronized data amount 607 represents an amount of data that has not been reflected onto the storage system 300 in a case of transmitting a usage application for extension of the usage period after the use of data has been permitted.

The usage application 600 is transmitted from the terminal 100 to the management server 200 in a case of starting to use data. In addition, the usage application 600 is transmitted for extension of the usage period. In this case, the terminal 100 may notify the user that the usage period is about to expire. The notified user can couple the terminal 100 to the network to transmit a usage application (extension application) to the management server 200.

Figure 4:
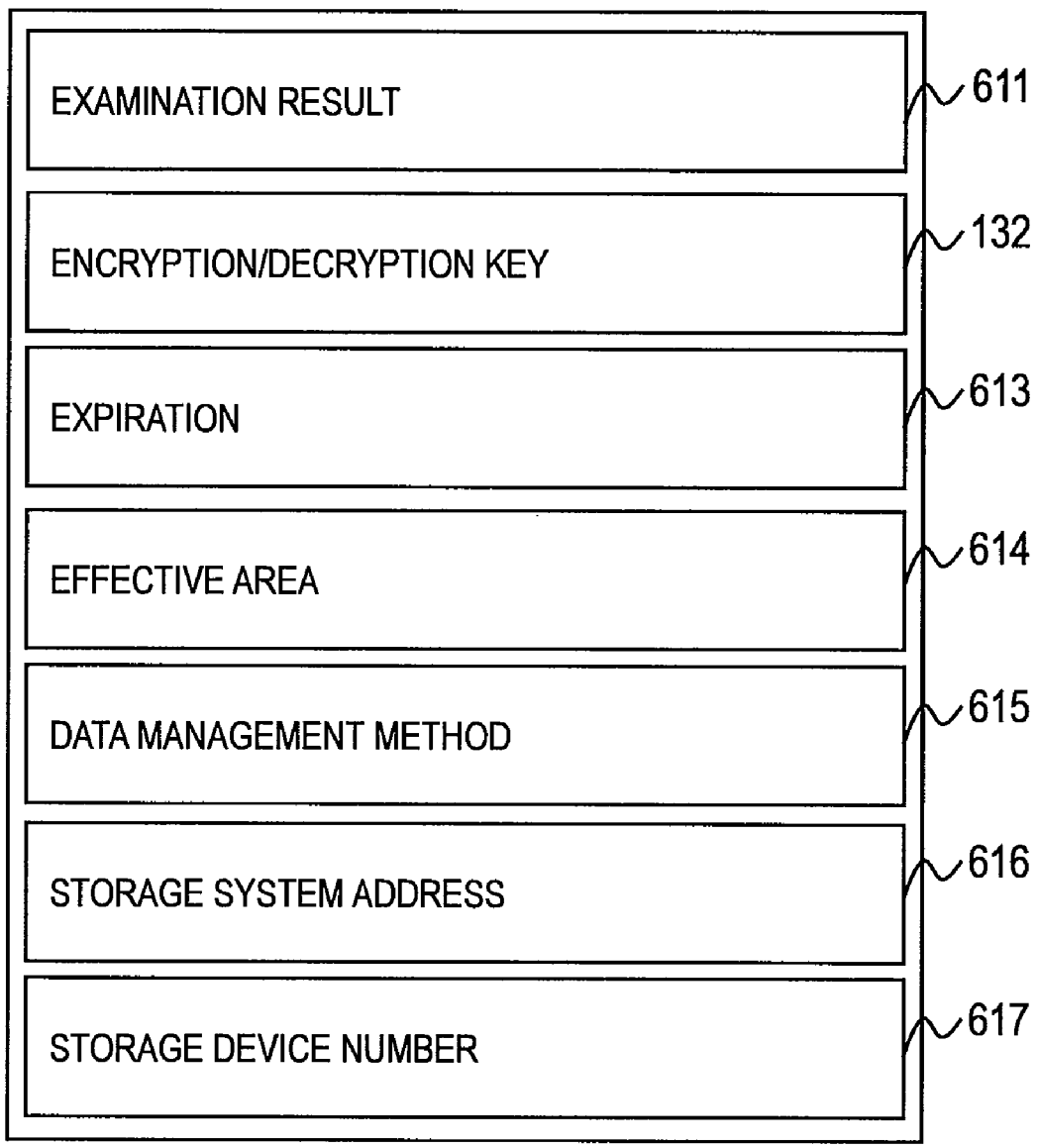
FIG. 4 is an explanatory diagram showing an example of a license transmitted from the management server to the terminal in accordance with the first embodiment of this invention.

FIG. 4 is an explanatory diagram showing an example of the license 610 transmitted from the management server 200 to the terminal 100 according to the embodiment of this invention.

The license 610 represents a response to the usage application 600 transmitted from the terminal 100 to the management server 200. The license 610 contains an examination result 611, the encryption/decryption key 132, an expiration 613, an effective area 614, the data management method 615, a storage system address 616, and a storage device number 617.

The examination result 611 represents a result from examining the usage application 600. If the examination result 611 has a value other than "permit", the other items are omitted without values' being set. Examples of the value other than "permit" include "rejection" set when the desired usage period is out of a permitted range and "data deletion" for instructing data deletion to be executed forcedly. Further, an instruction may be transmitted to the terminal 100 with another value set as the examination result 611.

The encryption/decryption key 132 represents a key for encrypting or decrypting data. The expiration 613 represents an expiration set for the encryption/decryption key 132. The effective area 614 represents a range in which the encryption/decryption key 132 can be used. The encryption/decryption key 132 may be a pair of an encryption key and a decryption key, or may be a single key used for both encryption and decryption. The encryption/decryption key 132 needs to be discarded in a case where at least one of the expiration 613 and the effective area 614 is no longer satisfied. If the encryption key and the decryption key are separately provided, at least the decryption key needs to be discarded.

The data management method 615 represents a method of holding data requested by the terminal 100. The data management method 615 specifies whether or not data is left on the storage device 141 with respect to each of the data layout information 130, the data 131, and the encryption/decryption key 132 of the terminal 100. In addition, the data management method 615 may specify how to handle the data within the terminal 100.

The storage system address 616 and the storage device number 617 represent information for specifying a data synchronization partner.

FIG. 5 is an explanatory diagram showing an example of the permit criteria table 620 for defining criteria used by the management server 200 to permit or reject the usage application 600 according to the embodiment of this invention.

The permit criteria table 620 defines a permit criteria 622 corresponding to a terminal status 621 and a response 623 for issuing a special instruction such as data deletion. Further, the permit criteria table 620 may be created differently for each terminal ID 601. The permit criteria table 620 is stored on the management server 200.

The terminal status 621 represents information indicating a state of the terminal 100. The terminal status 621 contains the current area 606, the unsynchronized data amount 607, and a data importance 625.

The current area 606 represents a location (area) where the terminal 100 currently exists. The unsynchronized data amount 607 represents an amount of data that has not been reflected onto the storage device 341 of the storage system 300 among data updated in the terminal 100. The data importance 625 represents an importance of data acquired by the data importance check program 311 of the storage system 300.

Further, the permit criteria table 620 shown in FIG. 5 will be described specifically with reference to a plurality of definitions (630 to 636).

The definition 630 indicates a case where the terminal 100 exists inside an office, holding most important data. In this case, the use of the data cannot be permitted outside the office because the value of a permittable area 628 is "inside office". In addition, because the value of a permittable period 627 is "10 seconds", it is necessary to transmit the usage application 600 every 10 seconds to update the license 610, which means that the data cannot be used offline.

The definition 631 indicates a case where the terminal 100 holding most important data exists outside an office. All of the items of the permit criteria 622 are set to "all denied", and in addition, the value of the response 623 indicates an instruction to forcedly delete the data. In other words, the definition 631 indicates a case where the most important data prohibited from being carried out of the office exists outside the office, and also indicates that in such a case, the data is forcedly deleted to thereby prevent information leakage.

The definition 632 indicates a case where the terminal 100 holding important data exists inside an office. The definition 632 also indicates that in this case, the data can be carried out of the office within 6 hours as long as the data is not left on the storage device 141. Application examples thereof include a possible case where the data such as sales materials for a new product needs to be used outside the office regardless of the importance of the data. In the possible case, the product data may be stored on the terminal 100 inside the office before a business trip, and the data may be used at a business trip destination.

The definitions 633 and 634 indicate that regarding the terminal 100 that stores data whose importance is "ordinary" and exists inside an office, the data whose unsynchronized data amount is less than 1 MByte can be carried out of the office without limitations, but the data whose unsynchronized data amount is 1 MByte or more can be carried out of the office but within a limit of 12 hours.

The definitions 635 and 636 indicate that the terminal 100 that stores data whose importance is "ordinary" and exists outside an office can have the usage period extended by 2 hours by a method in which the encryption/decryption key 132 is not left in the storage device 141 if there is no unsynchronized data, but the usage period cannot be extended if the unsynchronized data is left. In other words, it is possible to promote synchronization between the data stored on the terminal 100 and the data stored on the storage system 300. The definitions 635 and 636 indicate a possible case where a work outside the office is to be extended.

By thus defining the permit criteria table 620, proper information leakage countermeasures can be effected according to the location or state of the terminal, for example, security criteria are changed according to differences between domestic and foreign legal systems. For example, in a case of identifying the location of the terminal 100 by the GPS, the current area 606 even overseas can be identified, and in this case, a record may be added to the permit criteria table 620 with the current area 606 set to "inside office (overseas)".

FIG. 6 is an explanatory diagram showing an example of the license issuance history table 650 according to the embodiment of this invention.

The license issuance history table 650 is managed by the license issuance history management program 211, and is stored on the management server 200. The license issuance history table 650 contains a status 651 of the terminal 100 and license contents 652 representing contents of permitted access.

The status 651 of the terminal 100 has data recorded in a case where the management server 200 receives the usage application 600 from the terminal 100. The license contents 652 have data recorded in a case where the management server 200 permits the use in response to the received usage application 600.

The status 651 of the terminal 100 contains an examination date/time 653 representing a time at which the usage application 600 is received, the terminal ID 601, the current area 606, the data importance 625, and the unsynchronized data amount 607. The license contents 652 contain the permittable period 627, the permittable area 628, and a permittable data management method 629. In addition, the examination result 611, the issued encryption/decryption key 132, and the like (not shown) corresponding to the license contents 652 are all recorded. Further, parameters other than the above-mentioned ones may be recorded.

By managing the license issuance history table 650, it is possible to grasp the data that can be accessed by the terminal 100 at a given point of time. To be specific, it is possible to check the location of the terminal 100 and the amount of information loss due to deletion, in other words, how much information (unsynchronized data) exists only on the terminal 100.

Accordingly, if the terminal 100 is lost, it can be estimated based on the contents of the license issued immediately before the loss whether or not the data can be read at the time of the loss of the terminal 100 or at the current time, and it is possible to grasp a risk factor of information leakage or the like. In addition, if deletion of the data stored on the terminal 100 is to be remotely executed, the data deletion can be executed according to the state of the terminal 100.

By being executed by the CPU 243, the license issuance history management program 211 can cause the data stored in the license issuance history table 650 to be displayed, for example, on the output device 245. Further, by specifying the terminal 100, the date/time, or the like through the input device 244, it is possible to reference the license 610 issued to a specific terminal 100 or issued at a specific date/time. Further, if the forced data deletion or the like is executed upon detection of an abnormal state such as a case where the data whose data importance is "most important" has been carried out of the office, the management server 200 can transmit an email to notify an administrator to that effect. Alternatively, the output device 245 may be caused to display a message to the effect that an abnormality has occurred.

FIG. 7 is an explanatory diagram showing an example of the terminal management table 670 according to the embodiment of this invention.

The terminal management table 670 is managed by the terminal management program 212, and is stored on the management server 200. The terminal management table 670 contains the terminal ID 601, the password 602, the storage system address 616, the storage device number 617, the encryption/decryption key 132, a capacity 672 of the storage device 341, and a state 673 of the storage device 341.

The terminal ID 601 and the password 602 identify the terminal 100. The storage system address 616 and the storage device number 617 represent information for identifying the storage area of the synchronization partner, holding a correspondence relationship between the storage device 341 and the terminal 100.

The encryption/decryption key 132 is transmitted to the storage system 300 directly, and to the terminal 100 in a state of being embedded in the license 610. The storage system 300 can decrypt the data by using the transmitted encryption/decryption key 132 to execute the encryption/decryption program 313. The capacity 672 of the storage device 341 and the state 673 of the storage device 341 represent information relating to the storage area of the synchronization partner.

To be more specific, the example of a definition 674 indicates that the corresponding terminal 100 and the storage device 341 are not being used.

The example of definitions 675 and 676 indicates that the encryption/decryption key is updated in order to enhance the safety, and such preparation is underway as to switch the synchronization partner into a new storage device 341 whose storage device capacity is increased to 20 GBytes. The definition 675 represents the information corresponding to the storage device 341 currently in use, while the definition 676 represents the information corresponding to the new storage device 341 in preparation. When the preparation is complete, the synchronization partner is switched into the new storage device 341, and the contents of the new storage device 341 is transferred to the terminal 100, which completes the changing of the encryption/decryption key. At this time, the definition 675 may be deleted.

Figure 8:
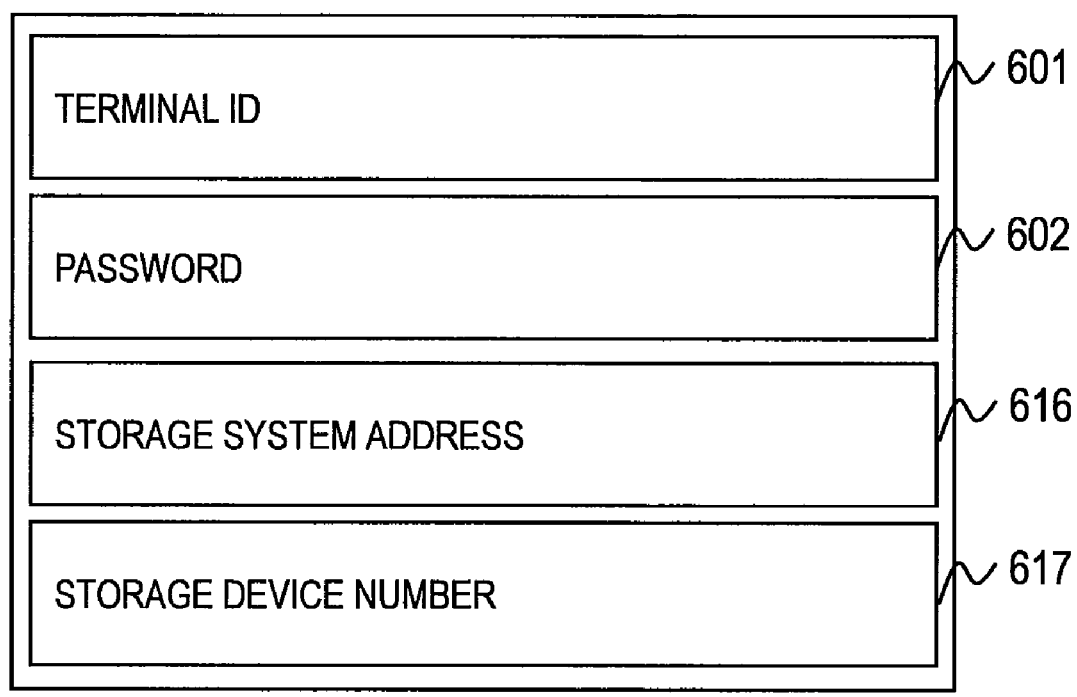
FIG. 8 is an explanatory diagram showing an example of an encryption/decryption key update request transmitted from the terminal in accordance with the first embodiment of this invention.

FIG. 8 is a diagram showing an example of an encryption/decryption key update request 690 transmitted from the terminal 100 to the management server 200 in a case of updating the encryption/decryption key according to the embodiment of this invention.

The encryption/decryption key update request 690 contains the terminal ID 601 and password 602 for identifying the terminal 100 and the storage system address 616 and storage device number 617 for identifying the synchronization partner storage system subjected to a key update.

When the user of the terminal 100 inputs a key update request to the agent program 116, the data synchronization program 114 is executed to transmit the encryption/decryption key update request 690 to the management server 200. When the management server 200 receives the encryption/decryption key update request 690, the terminal management program 212 is executed to instruct the storage system 300 to update the key. Upon reception of an instruction to update the encryption/decryption key, the storage system 300 executes the key update program 312 to update the encryption/decryption key. The procedure for updating the encryption/decryption key will be described later in detail with reference to FIG. 13.

In addition, an update of the encryption/decryption key may be executed not only in response to the instruction from the user of the terminal 100 as described above but also every predetermined time. However, if the encryption/decryption key is updated, all of the encrypted data 131 stored on the storage device 141 of the terminal 100 must be updated, which requires much processing time. Therefore, the update of the encryption/decryption key is executed in a case where, for example, a time longer than several hours (for example, 1 day) has elapsed since the data is carried out of the office. A specific timing for updating the encryption/decryption key may be set as a timing when the usage application is received from the terminal 100. Alternatively, an elapsed time may be managed since the use of data is permitted by the management server 200 to issue the instruction to the terminal 100 after a predetermined elapsed time.

Figure 9:
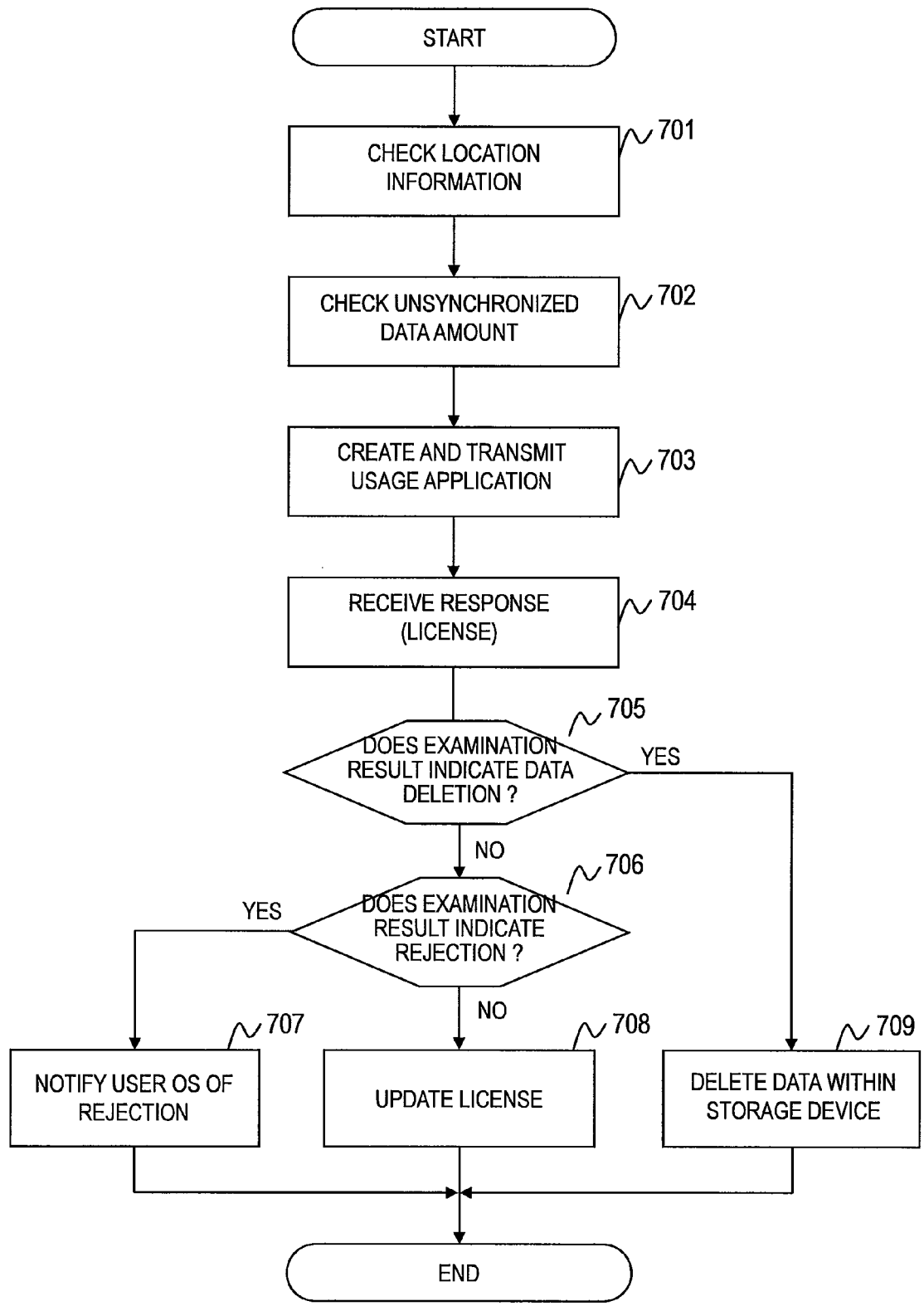
FIG. 9 is a flowchart showing a procedure from transmission of the usage application until a reception of the license performed by the terminal in accordance with the first embodiment of this invention.

FIG. 9 is a flowchart showing a procedure from transmission of the usage application 600 until the reception of the license 610 performed by the terminal 100 according to the embodiment of this invention.

The terminal 100 executes the processing at a timing when the terminal 100 is instructed to transmit the usage application 600 by the user or when the expiration 613 of the existing license 610 is nearing. The expiration 613 of the existing license 610 is managed by the license management program 112. For example, if the expiration 613 of the existing license 610 is nearing, an alert message is displayed for the user.

The CPU 143 of the terminal 100 executes the license management program 112 via the agent program 116 in order to transmit the usage application 600 to the management server 200.

The CPU 143 of the terminal 100 executes the positioning program 110 to acquire the current location information of the terminal 100 (Step 701). Then, the CPU 143 executes the data difference management program 115 to acquire the current unsynchronized data amount 607 (Step 702).

The CPU 143 of the terminal 100 creates the usage application 600 shown in FIG. 3 and transmits the usage application 600 to the management server 200 (Step 703). With regard to the items set in the usage application 600 other than the information acquired in Step 701 and Step 702, information specified when the user transmits the usage application 600 may be set, or the information of the existing license 610 may be taken over.

Upon reception of the usage application 600 from the terminal 100, the management server 200 judges whether or not the terminal 100 is to be permitted to use the data based on the items set in the received usage application 600. After the judgment is finished, the management server 200 transmits the license 610 to the terminal 100. A procedure for a judgment processing will be described later with reference to FIG. 10.

Upon reception of the response (license 610) from the management server 200 (Step 704), the CPU 143 of the terminal 100 executes the processing based on the value set as the examination result 611.

If the examination result 611 is set to "data deletion" (Step 705 results in "Yes"), the CPU 143 of the terminal 100 deletes the data stored on the storage device 141 of the terminal 100 (Step 709).

If the examination result 611 is set to "rejection" (Step 706 results in "Yes"), the CPU 143 of the terminal 100 notifies the user of the rejection via the agent program 116 (Step 707).

If the examination result 611 is set to "permit" (Step 706 results in "No"), the CPU 143 of the terminal 100 discards the old license 610 and creates the updated license 610 (Step 708).

Figure 10:
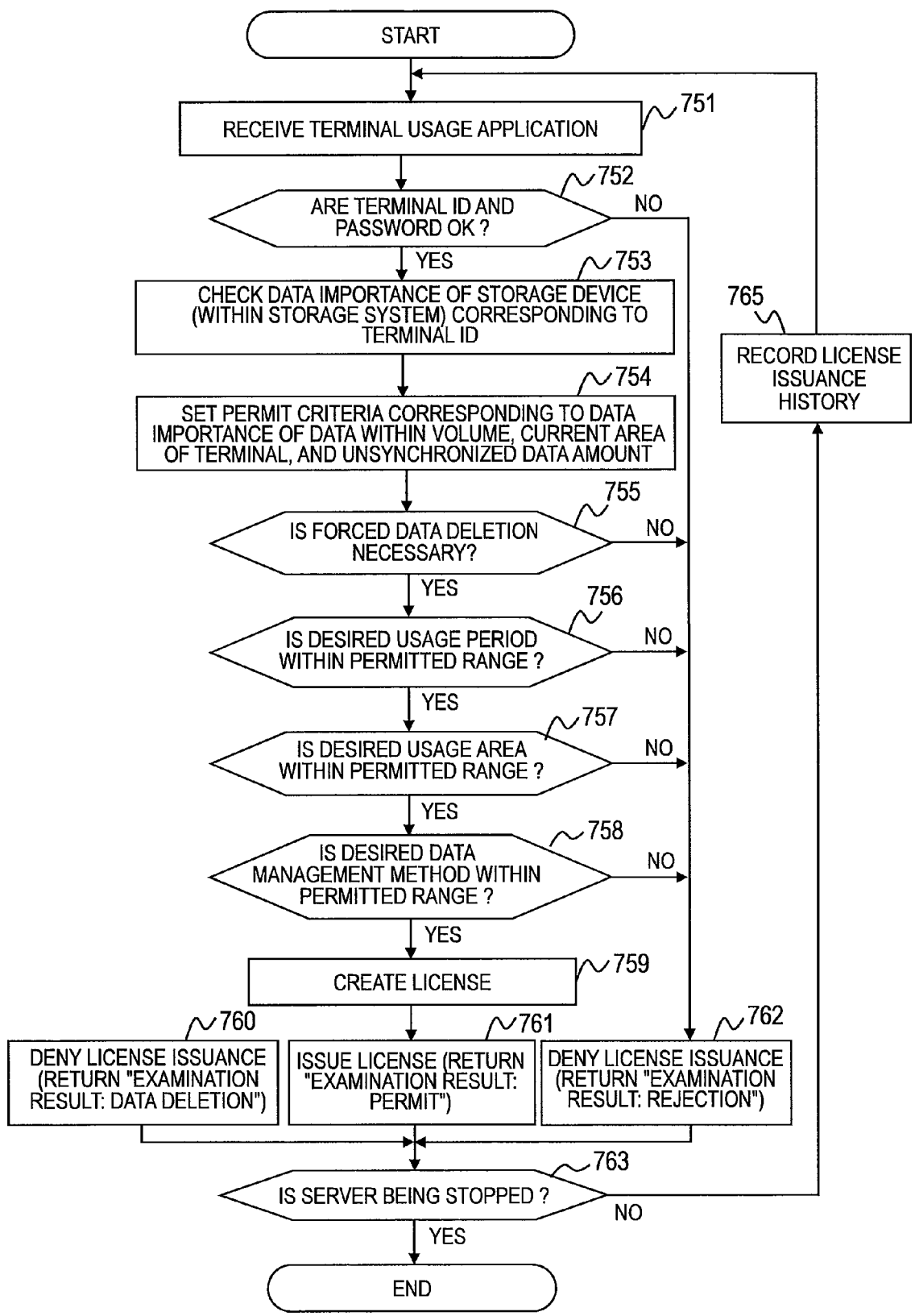
FIG. 10 is a flowchart showing a procedure from reception of the usage application until transmission of the license performed by the management server in accordance with the first embodiment of this invention.

FIG. 10 is a flowchart showing a procedure from reception of the usage application 600 until transmission of the license 610 performed by the management server 200 according to the embodiment of this invention.

The CPU 243 of the management server 200 executes the license issuance program 210 at the time of bootup of the management server 200 to start the processing.

Upon reception of the usage application 600 from the terminal 100 (Step 751), the CPU 243 of the management server 200 first judges whether or not the terminal ID 601 and password 602 contained in the usage application 600 are correct (Step 752). To be specific, the CPU 243 executes the terminal management program 212 to compare the terminal ID 601 and password 602 with those of the terminal management table 670. If the terminal ID 601 or the password 602 has an incorrect value (Step 752 results in "No"), the examination result 611 of the license 610 is set to the value "rejection" (Step 762).

If the terminal ID 601 and the password 602 have correct values (Step 752 results in "Yes"), the CPU 243 of the management server 200 acquires from the storage system 300 the data importance 625 of the data stored on the storage device 341 serving as the synchronization partner of the terminal 100 (Step 753). The data importance 625 of the data has been acquired by the storage system 300 executing the data importance check program 311.

The CPU 243 of the management server 200 then references the permit criteria table 620 to acquire the permit criteria 622 corresponding to the current area 606 of the terminal 100, the data importance 625, and the unsynchronized data amount 626 (Step 754).

The CPU 243 of the management server 200 judges whether or not the special response 623 such as forced data deletion is necessary (Step 755). If the special response 623 such as forced data deletion is necessary (Step 755 results in "Yes"), the CPU 243 returns the examination result 611 of the license 610 which is set to "data deletion" (Step 760). Examples of conditions for executing the forced data deletion include a case where the terminal 100 storing the data whose data importance is "most important" is carried out of the office (case of the definition 631 of FIG. 5)

On the other hand, if the special response 623 such as forced data deletion is unnecessary (Step 755 results in "No"), the CPU 243 of the management server 200 judges whether or not the desired usage period 603 specified in the usage application 600 is within a permitted range, in other words, within the permittable period 627 of the permit criteria table 620 (Step 756). If the desired usage period 603 is outside the permitted range (Step 756 results in "No"), the CPU 243 returns the examination result 611 of the license 610 which is set to "rejection" (Step 762).

If the desired usage period 603 is within the permitted range (Step 756 results in "Yes"), the CPU 243 of the management server 200 judges whether or not the desired usage area 604 specified in the usage application 600 is within a permitted range, in other words, within the permittable area 628 of the permit criteria table 620 (Step 757). If the desired usage area 604 is outside the permitted range (Step 757 results in "No"), the CPU 243 returns the examination result 611 of the license 610 which is set to "rejection" (Step 762).

If the desired usage area 604 is within the permitted range (Step 757 results in "Yes"), the CPU 243 of the management server 200 judges whether or not the desired data management method 605 specified in the usage application 600 is within a permitted range, in other words, within the permittable data management method 629 of the permit criteria table 620 (Step 758). If the desired data management method 605 is outside the permitted range (Step 758 results in "No"), the CPU 243 returns the examination result 611 of the license 610 which is set to "rejection" (Step 762).

If the desired data management method 605 is within the permitted range (Step 758 results in "Yes"), the CPU 243 of the management server 200 sets the examination result 611 of the license 610 to "permit", creates the license 610 (Step 759), and issues the license 610 (Step 761).

If the management server 200 is not about to execute a stopping processing (Step 763 results in "No"), the CPU 243 of the management server 200 records a record license issuance history in the license issuance history table 650 (Step 765), and receives the subsequent usage application 600 (Step 751).

Figure 11:
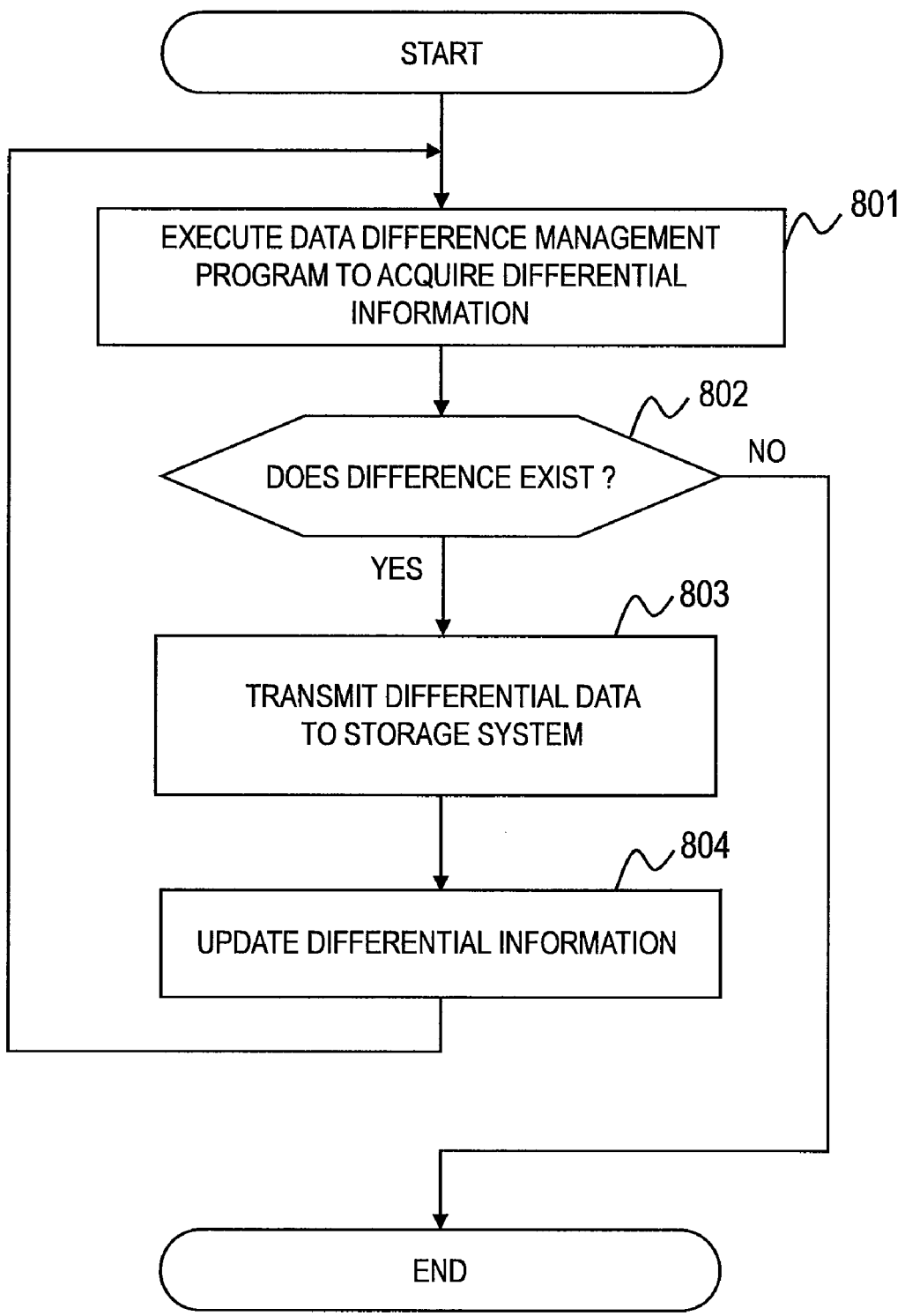
FIG. 11 is a flowchart showing a procedure for synchronization between the terminal and a storage system in accordance with the first embodiment of this invention.

FIG. 11 is a flowchart showing a procedure for synchronization between the terminal 100 and the storage system 300 according to the embodiment of this invention.

After the terminal 100 is booted up, the CPU 143 of the terminal 100 executes the data synchronization program 114, and executes the processing at a predetermined cycle.

The CPU 143 of the terminal 100 first executes the data difference management program 115 to examine the presence or absence of the unsynchronized data and acquire differential information (Step 801). The unsynchronized data represents a difference between the contents of the data 131 (or the data cache 121) of the terminal 100 and the data stored on the storage device 341 within the storage system 300.

The CPU 143 of the terminal 100 judges whether or not there exists a difference based on the differential information acquired in Step 801 (Step 802). If there exists no difference (Step 802 results in "No"), the processing comes to an end.

If there exists a difference (Step 802 results in "Yes"), the CPU 143 of the terminal 100 transfers the differential data to the storage system 300 (Step 803).

After the transfer of the differential data is complete, the CPU 143 of the terminal 100 executes the data difference management program 115 to update the differential information (Step 804). To be specific, the unsynchronized data is updated to synchronized data.

The CPU 143 of the terminal 100 executes Steps 801 to 804 until there exists no difference.

Figure 12:
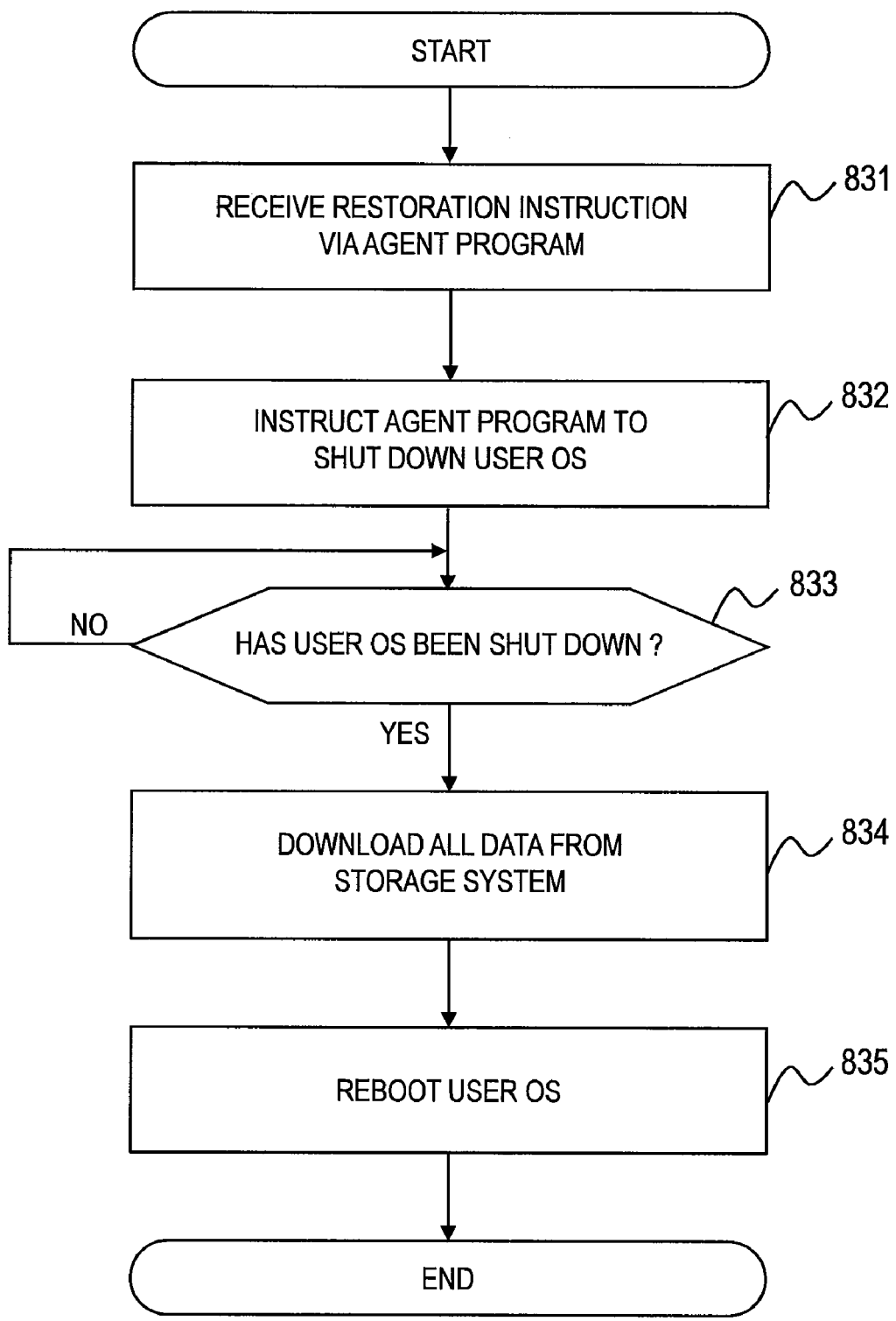
FIG. 12 is a flowchart showing a restoration procedure performed by the terminal in accordance with the first embodiment of this invention.

FIG. 12 is a flowchart showing a restoration procedure performed by the terminal 100 according to the embodiment of this invention.

The restoration processing represents a processing of transferring the data layout information 130 and the data 131 from the storage device 341 of the storage system 300 to the storage device 141 of the terminal 100.

The CPU 143 of the terminal 100 first receives a restoration instruction from the management server 200 or the user via the agent program 116 (Step 831). The CPU 143 of the terminal 100 causes the agent program 116 to stop all of the programs stored in the user OS area 101 (Step 832).

The CPU 143 of the terminal 100 checks whether or not the programs executed in the user OS area 101 are stopped (Step 833). If the programs executed in the user OS area 101 are stopped (Step 833 results in "Yes"), the CPU 143 acquires data from the storage device 341 of the storage system 300, and effects synchronization (matching) of the contents of the storage device 141 of the terminal 100 (Step 834).

When the synchronization between the storage device 341 of the storage system 300 and the storage device 141 of the terminal 100 is complete, the CPU 143 of the terminal 100 reboots the programs stored in the user OS area 101 (Step 835).

Figure 13:
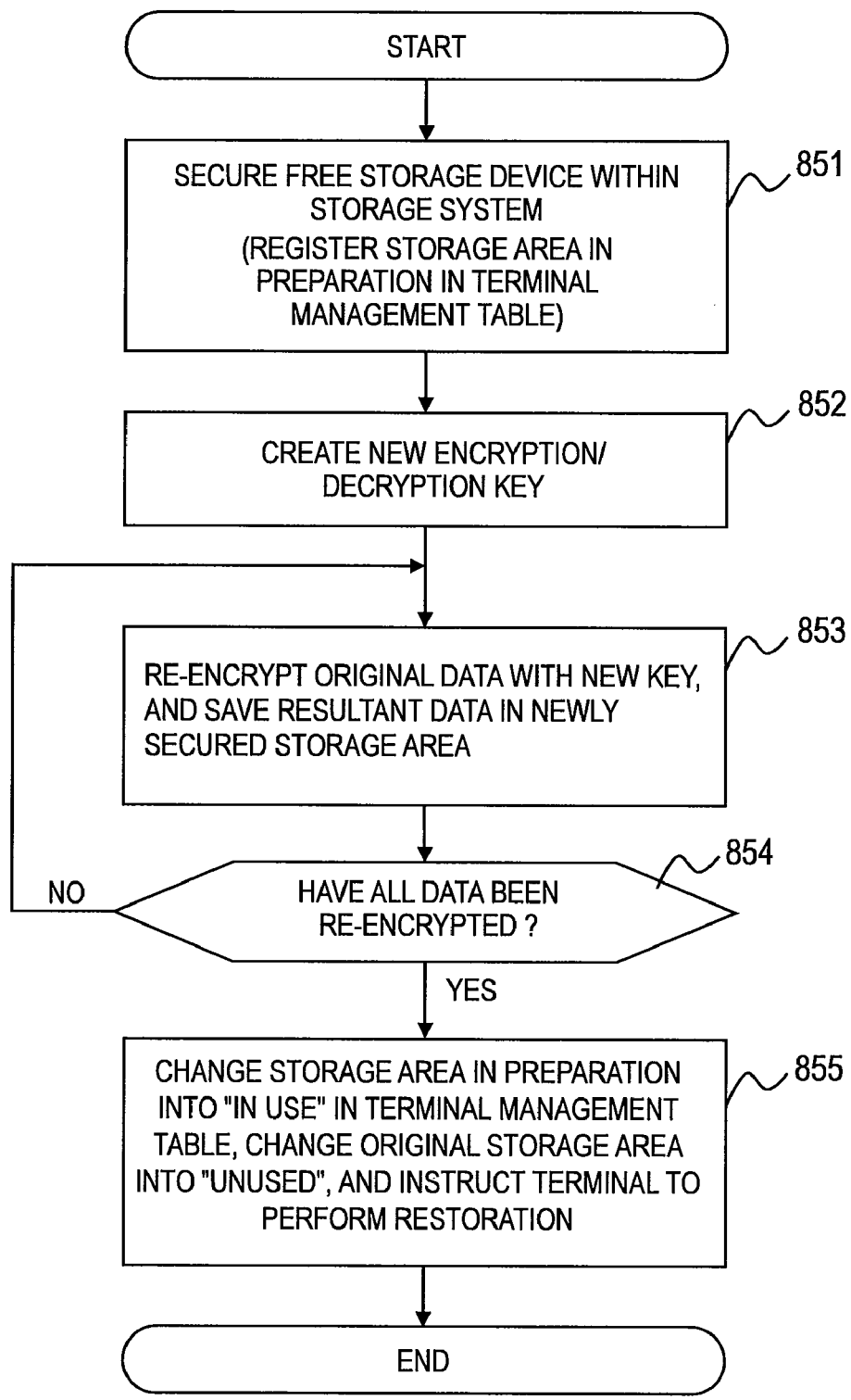
FIG. 13 is a flowchart showing a procedure for an encryption/decryption key update processing performed by the terminal management program of the management server in accordance with the first embodiment of this invention.

FIG. 13 is a flowchart showing a procedure for an encryption/decryption key update processing performed by the terminal management program 212 of the management server 200 according to the embodiment of this invention.

Upon reception of the encryption/decryption key update request 690 from the terminal 100 or the like, the CPU 243 of the management server 200 searches the terminal management table 670 for the storage device 341 that is unused within the storage system 300, and secures the retrieved storage device 341 (Step 851). Further, the CPU 243 generates the new encryption/decryption key (Step 852).

The CPU 243 of the management server 200 uses the new key generated in Step 822 to re-encrypt the data stored on the storage device 341 specified in the encryption/decryption key update request 690, and instructs the storage system 300 to store the data on the storage device 341 newly secured in Step 851 (Step 853). Upon reception of the instruction to update the encryption/decryption key, the storage system 300 executes the key update program 312 to execute the instructed processing.

The CPU 243 of the management server 200 repeats the processing until all of the data is re-encrypted (Step 854), and after completing the processing, updates the terminal management table 670 (Step 855). To be specific, in the terminal management table 670, the record corresponding to the storage device 341 on which the newly encrypted data is stored has the storage device state 673 updated into "in use", while the record corresponding to the old storage device 341 has the storage device state 673 updated into "unused". Then, the CPU 243 of the management server 200 instructs the terminal 100 to start the restoration, and the processing comes to an end.

According to the embodiment of this invention, the method for prevention of information leakage can be changed depending on the location of the terminal 100, the data importance, and the like. In other words, upon reception of the usage application 600 from the terminal 100, the management server 200 determines the information leakage prevention method such as the data deletion method based on the location of the terminal 100, the data importance, and the like, and transmits the license 610 to the terminal 100. The terminal 100 executes the information leakage countermeasure specified in the license 610 by the management server 200. In addition, the terminal 100 neither needs to judge the data importance nor needs to hold a parameter representing the data importance, so it is possible to solve such problems that:

(A) it is not preferable to hold information indicating the importance of internal data within the terminal 100 prone to theft; and (B) the data importance cannot be checked during a period after the terminal 100 has discarded the decryption key.

According to the embodiment of this invention, even when the terminal 100 is in an offline state or the terminal 100 is disassembled, it is possible to delete the data or bring the terminal 100 into a state in which the data cannot be read. To be specific, if the offline state continues for equal to or longer than the period specified in the license 610, the data cannot be read until the usage application is again transmitted to the management server 200 and granted a permit. Alternatively, by setting the data management method to the method in which the data is held only in the memory 142, the data can be erased at the same time as the power source is shut off.

According to the embodiment of this invention, when the data deletion is to be executed remotely, the state of the terminal 100 can be grasped by referring to the license issuance history table 650, which allows the deletion to be executed by the optimum method according to the state of the terminal 100.

According to the embodiment of this invention, the terminal can recover the optimum state based on the method of deleting the data stored on the terminal. For example, if the encryption/decryption key is stored only in the memory 142 without being stored on the storage device 141, the state of the terminal 100 can be recovered only by acquiring the encryption/decryption key again. In general, as the safety against information leakage is further enhanced, the convenience is liable to become lower. Accordingly, there can be expected such an effect as to enhance the convenience of the terminal 100 by effecting the proper information leakage countermeasures based on the location of the terminal 100, the data importance, or the like.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
   a storage system for storing data;
   a terminal for using the data;
   a management server coupled to the storage system and the terminal; and
   a positioning module for identifying a location of the terminal,
   wherein the storage system comprising:
   a first interface coupled to the management server; a first processor coupled to the first interface; a first memory coupled to the first processor; and a first storage device for storing the data,
   wherein the terminal comprising:
   a second interface coupled to the management server;
   a second processor coupled to the second interface; and
   a second storage device for storing a copy of the data which includes a volatile storage area and a nonvolatile storage area,
   wherein the management server comprising:
   a third interface coupled to the storage system and the terminal;
   a third processor coupled to the third interface; and a third memory coupled to the third processor,
   wherein the terminal is configured to:
   identify the location of the terminal by the positioning module in a case of using the data;

transmit terminal information including the identified location of the terminal to the management server; and transmit a usage request for the data to the management server, wherein the management server is configured to:

judge whether or not use of the data is to be permitted based on the terminal information; and transmit permit information including usage conditions for the data to the terminal in a case where the use of the data is to be permitted, wherein the terminal is further configured to:

select at least one of the volatile storage area and the nonvolatile storage area based on the usage conditions; and store the copy of the data in the selected storage area, wherein the storage system is further configured to encrypt data to be used by the terminal and transmits the encrypted data, wherein the permit information includes a decryption key for decrypting the encrypted data, and wherein the terminal is further configured to select at least one of the volatile storage area and the nonvolatile storage area based on the usage conditions for the requested data, and stores the decryption key in the selected storage area.

2. The computer system according to claim 1, wherein the terminal is further configured to store the decryption key only in the volatile storage area.

3. A terminal, which stores a copy of data in a computer system comprising:

a storage system storing the data;

a management server coupled to the storage system; and a positioning module for identifying a location of the terminal, the terminal comprising:

an interface coupled to the management server;

a processor coupled to the interface; and a storage device for storing the copy of the data which includes a volatile storage area and a nonvolatile storage area, wherein the terminal is configured to:

identify the location of the terminal by the positioning module in a case of using the data, transmit terminal information including the identified location of the terminal is transmitted to the management server, and transmit a usage request for the data to the management server, and wherein the terminal is configured to:

select at least one of the volatile storage area and the nonvolatile storage area based on the usage conditions, and the copy of the data is stored therein in a case of which permit information including usage conditions for the data permitted based on the terminal information has been received from the management server and store the copy of the data in the selected storage area, wherein the storage system encrypts the data requested by the terminal and transmits the encrypted data, wherein the permit information includes a decryption key for decrypting the encrypted data, and wherein the terminal is further configured to select at least one of the volatile storage area and the nonvolatile storage area based on the usage conditions for the requested data, and stores the decryption key in the selected storage area.

4. The terminal according to claim 3, wherein the terminal is further configured to store the decryption key only in the volatile storage area.

* * * * *